Feb. 16, 1937.  C. W. KLEIN ET AL  2,070,663
PROTECTIVE COVER FOR FOOD PANS
Filed May 13, 1936
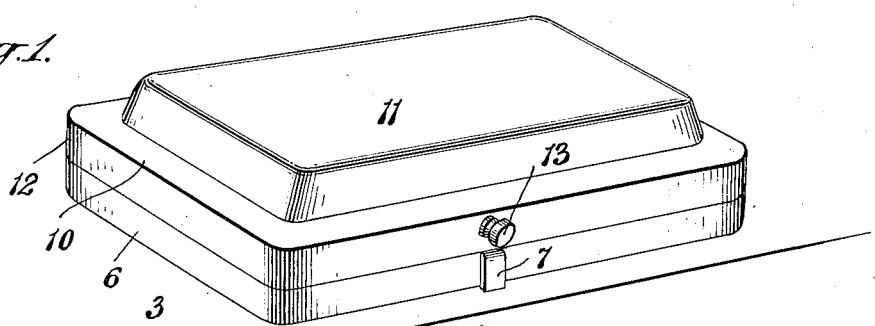
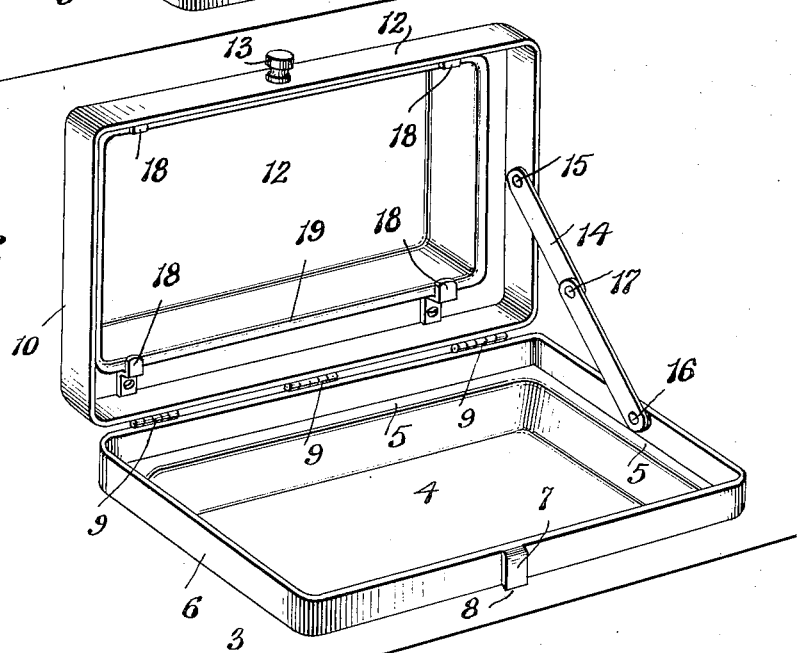
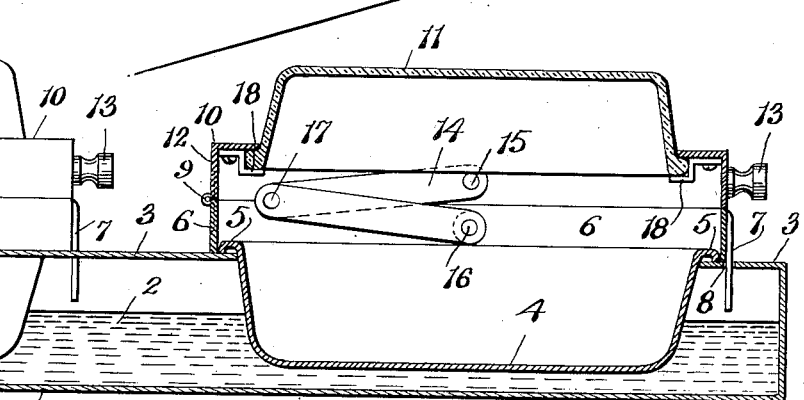
INVENTORS
Calvin W. Klein
Leo Esterow & Abraham Klein
BY
Harry Radzinsky
ATTORNEY Patented Feb. 16, 1937

2,070,663

UNITED STATES PATENT OFFICE 2,070,663

PROTECTIVE COVER FOR FOOD PANS

Calvin W. Klein, Leo Esterow, and Abraham Klein, New York, N. Y.

Application May 13, 1936, Serial No. 79,452

3 Claims. (Cl. 312—114)

The invention relates to protective devices for foods and similar products and has for its object the provision of a device especially suitable for use in restaurants, kitchens and other places where food is prepared and served, for protecting and keeping hot or cold, the food or other contents of dishes or like receptacles.

At the present time many restaurants, and particularly those of the so-called cafeteria type, keep the foods being served in shallow open-top dishes or pans which seat in apertures in the top of a steam table, or in the case of cooling, in the top of an ice chest or refrigerating device. The more fastidious of restaurant owners endeavor to protect the food contents of such receptacles by covering them with lids, when such lids are available, or else by inverting pans over those in which the foods are contained, or else by the use of any available make-shift covering. Most restaurants, and particularly those where considerable business is done, simply leave the food pans open and exposed. This unsanitary practice naturally exposes the foods to dust, dirt and germs, and in addition prevents the food from being properly heated or cooled, since the upper surface of the foods, in cases where it is being heated by a steam table, is cooler than the lower portion and soon an unappetizing crust or skin forms on the top of the food, greatly detracting from its appearance and creating the aspect of staleness which is not as a matter of fact, the actual fact.

In cases where the restaurant owner endeavors to protect his foods by covering them, he is compelled to use covers and other make-shift means which conceal the foods from the customer, whose appetite might be greatly enhanced by the sight of an appetizing and tasty dish. In addition, the removal and replacement of poorly fitting make-shift lids or inverted pans is difficult and troublesome for the busy chef or counterman, and accordingly such covers are, in the majority of cases, wholly omitted.

The primary object of the present invention is to provide a device, easily fitted to the usual type of steam table, ice chest or refrigerating casing which will act as a sanitary protective cover for food pans or dishes and their contents; which can be opened and closed with one hand, leaving the chef's or counterman's other hand available for holding a plate to receive the food; which will be provided with a transparent top portion permitting the contents of the covered pan to be visible, and which will serve to aid in the distribution of the heat or cold and avoid the formation of the crust or skin on top of the food heretofore referred to.

These and other objects are attained by the improved structure, an embodiment of which is shown in the accompanying drawing and hereinafter described and claimed.

In the drawing, Fig. 1 is a perspective view of the cover device in its closed position; Fig. 2 is a similar view of the same in open position; and Fig. 3 is a transverse sectional view of one of the covers in closed position.

It is customary in restaurants, large kitchens and other places where foods are sold to keep the foods hot by means of a so-called "steam table". Such a device is diagrammatically illustrated in part in Fig. 3 of the drawing, and consists of a casing 1 in which water 2 is maintained at high temperature. The top plate 3 of such device is apertured to receive dishes or pans 4, which have their lower portions surrounded by the hot water 2 to thereby heat their food contents. Such dishes or pans are supported by their laterally projecting rim or flange 5 which rests upon the upper face of the top 3 of the heating device.

The cover member or protective device to which this invention relates is provided with a frame 6, preferably made of non-corrosive metal, which rests on the top 3 and closely surrounds the rim 5 of the pan. Any suitable known means may be employed for holding the frame 6 in position on the top 3, and for this purpose is disclosed a lug 7 formed or secured at the front of the frame and which enters an aperture or slot 8 in the top, as clearly shown in Fig. 3. Said lug 7 may be slightly bent or inclined to fit in the slot 8 snugly and frictionally resist any tendency of the front portion of the frame 6 to rise when the cover member of the device is swung upwardly as hereinafter described.

Hinged at 9, to the upper edge of the frame 6 is the cover member, formed of two main elements, namely, a frame portion 10, and a domed transparent top 11 through which the contents of the pan 4 are visible when the cover is in its closed position.

The frame portion 10 of the cover is formed with a dependent circumferential flange 12, the front portion of which is provided with a knob 13 or other type of handle by which the cover can be raised and lowered. A collapsible strut 14 is pivoted at 15 to the inner face of flange 12 at one end of the cover and has its opposite end pivotally secured at 16 to the inner face of the frame 6. The two legs of the strut are pivotally connected together at 17. The transparent portion 11 of the cover member is composed of glass or any similar material fits in an aperture provided in the frame portion for it, and is domed as shown to accommodate such foods as may rest in the pan 4 and project upwardly therefrom. Said transparent portion 11 is removably held in position in the frame portion 12 by any suitable means, such as by the fingers 18 which overlie the bead or edge 19 on the member 11. These fingers 18 are arranged to be swung away from the bead 19 to permit the member 11 to be released for washing or for replacement in case of breakage.

In use the device is easily attached to a heating or cooling casing and when the cover member is in its closed position, as shown in Figs. 1 and 3 it will be seen that the food contents of the pan over which the cover member is disposed will be fully and completely protected. At the same time, the transparent portion of the cover member permits the contents of the pan to remain visible to attract purchasers. To serve a portion of food from the pan merely requires raising of the cover by the knob or other handle 13, and the cover when raised will remain so by the action of the strut 14, permitting the chef or counterman to use both hands in serving the food from pan to plate. The device can be closed with one hand and when closed acts to confine and circulate the heat or steam about the contents of the pan thereby keeping the food uniformly heated and avoiding the formation of a crust on its upper surface, as well as keeping it clean, sanitary and appetizing in appearance.

While we have herein described the device as being applicable for use in connection with heating means for foods it will be understood that it is equally useful in connection with cooling devices, or where the foods are merely displayed at room temperature.

What we claim is:

1. A device for protecting the food contents of restaurant steam tables and the like comprising, a base frame adapted to rest on a table and surround a pan aperture therein, a cover frame hinged to the base frame, means on the base frame for detachably engaging the table to prevent upward tilting movement of said base frame when the cover frame is raised, a dome-shaped transparent member enclosed by the cover frame and carried by it and having its side walls located inwardly from the sides of said cover frame and thereby protected by said frame, the side walls and top of the transparent member permitting angular inspection of the food contents of a pan seated in the pan aperture.

2. A device for protecting the food contents of restaurant steam tables and the like comprising, two frames hinged together, an elongated domed glass cover member fitted within one of the frames and having its top elevated above said frame, means for detachably holding said cover member within the frame, the other frame adapted to rest upon a steam table and surround a tray aperture therein, said steam table having an aperture, and a dependent finger upon the last mentioned frame fitting into said aperture and preventing upward tilting movement of the last mentioned frame from the table when the other frame is manually raised.

3. A device for protecting the food contents of steam tables and the like comprising, a frame adapted to rest on top of a steam table and surround a pan aperture therein, said frame including an upstanding portion, a cover member hinged at the back portion of said portion, said cover member including a domed, transparent central portion and a surrounding protecting frame, means for removably holding the domed central portion within said protecting frame and means for holding the cover member in a raised position.

CALVIN W. KLEIN.
LEO ESTEROW.
ABRAHAM KLEIN.